United States Patent [19]

Smith

[11] Patent Number: 5,679,017
[45] Date of Patent: Oct. 21, 1997

[54] UNIVERSAL BATTERY CHARGER

[75] Inventor: Richard B. Smith, Bethel, Conn.

[73] Assignee: Duracell Inc., Bethel, Conn.

[21] Appl. No.: 483,679

[22] Filed: Jun. 7, 1995

[51] Int. Cl.$^6$ .................................................. H01R 29/00
[52] U.S. Cl. .................. 439/172; 439/500; 320/2
[58] Field of Search ........................ 439/172, 174, 439/170, 166, 500, 660, 929, 620, 622; 320/2

[56] References Cited

U.S. PATENT DOCUMENTS

| | | | |
|---|---|---|---|
| 5,065,082 | 11/1991 | Fushiya | 320/2 |
| 5,148,094 | 9/1992 | Parks et al. | 320/2 |
| 5,157,318 | 10/1992 | Wang | 320/2 |
| 5,280,229 | 1/1994 | Faude et al. | 320/2 |
| 5,357,185 | 10/1994 | Chen | 320/2 |

*Primary Examiner*—Jes F. Pascua
*Attorney, Agent, or Firm*—Barry D. Josephs; Paul I. Douglas

[57] ABSTRACT

Disclosed is a charger unit for charging a rechargeable energy storage device. In particular, a universal charger unit is disclosed which comprises a connector having a set of externally accessible contacts for making electrical contact with a corresponding set of receptor contacts on a rechargeable energy storage device. The connector, which may comprise a removable module, also preferably includes a sensor to interact with the structure of the receptor on the rechargeable device, so that the output of the charger unit can be regulated to be compatible with the electrical characteristics of the rechargeable device as determined by the sensor. The charger unit and/or connector may include one or more replaceable electronics modules.

1 Claim, 3 Drawing Sheets

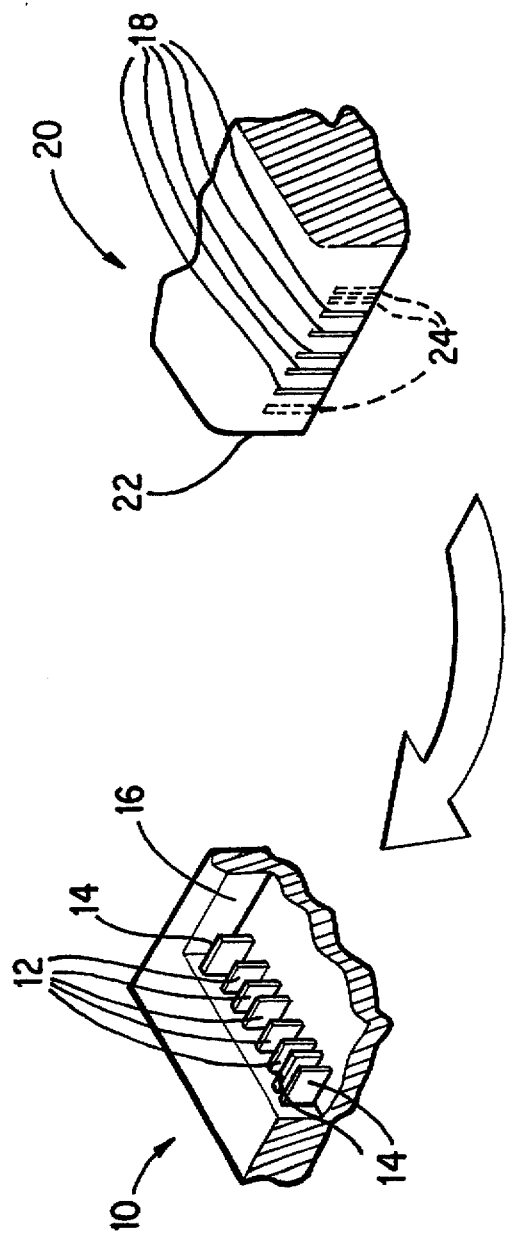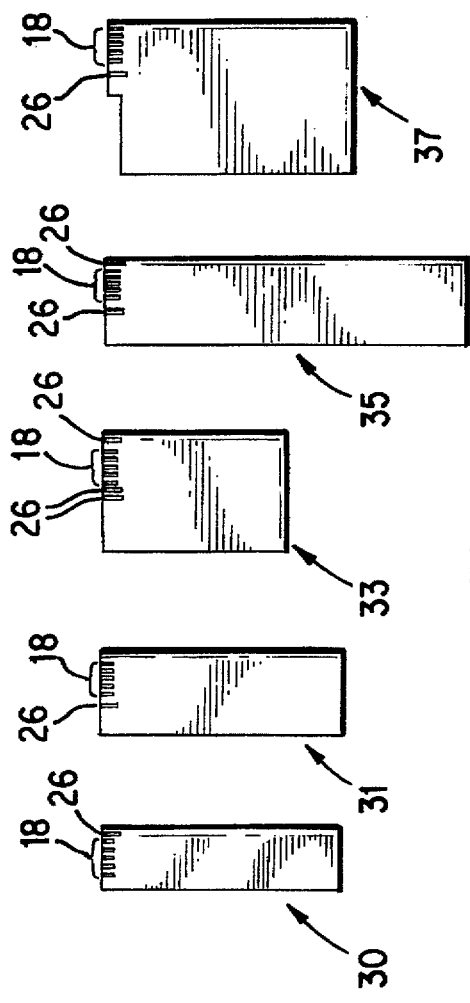

UNIVERSAL BATTERY CHARGER

The present invention relates to an improved charger unit for a rechargeable energy storage battery. In particular, the invention relates to a universal connector for a charger unit enabling recharging of a variety of rechargeable storage batteries having different sizes, shapes, voltages, and/or capacities.

It is becoming increasingly popular to be able to operate electrical equipment without the need to be physically connected to a fixed electrical network. Such portable, electrically powered equipment, e.g., video camcorders, cellular telephones, laptop computers, and the like, typically employ rechargeable energy storage devices to power the equipment. Under normal operating conditions, the equipment is engineered to be powered for several hours by a fully charged energy storage device. Once the energy storage device is exhausted, the device must be connected to a charger unit in order to fully restore the electrical charge.

In general, practically every portable electric device which now is employed in the home, trade, or industry, relying upon a rechargeable power source, requires its own specific electronically and mechanically matched charger unit. While each individual charger unit is equipped with similar components such as transformers, rectifier circuits, control systems, temperature sensors, and the like, these individual chargers are not suitable for interchangeable use with rechargeable storage batteries of different physical dimensions, different voltages or capacities, and/or feature different interconnection arrangements.

Accordingly, an individual owning or using multiple portable electrical devices, inconveniently and uneconomically, must maintain, and perhaps transport, an inventory of specialized charger units and/or adaptors to service his range of different rechargeable energy sources. In addition, an individual must replace his entire charger unit, if he desires to implement a new charge control regime (e.g., faster charge, enhanced cycle life, etc.). Costs of charger units also are inflated by the fact that charger manufacturers currently build individualized, custom charger units without any interchangeable connectability. It would be highly desirable to provide a single universal charging system that is capable of recharging energy storage batteries of varying sizes, voltages, and/or capacities. It also would be desirable for manufacturers to be able to design various charger unit forms for a single type storage battery pack in order to save costs and enhance speed of manufacturing.

Now, according to the present invention, a charger unit is provided which features a connector with standardized, externally accessible, electrical contacts designed to mate with corresponding receptor contacts on a variety of rechargeable energy storage battery packs. The connector further is equipped with a sensor to differentiate between a standard series of battery pack receptor designs, so as to enable the sensor to indicate to the charger unit the particular electrical characteristics of the battery pack to be recharged. The charger unit also may include replaceable electronics modules to enable modification or upgrade of the charging regime of, or communication with, the charger unit or to add additional user displays to the charger unit.

In a preferred embodiment, a rechargeable energy storage battery pack includes a set of receptor contacts, typically female contacts, at one end of its casing for mating with suitably matched connector contacts, typically male contacts, on an electrical device being powered, and/or, in accordance with the present concept, suitably matched connector contacts on a charging unit to which the battery pack is connected during periodic recharging. The contacts comprise a positive and a negative contact, and generally also include additional contacts suitably fitted for use with charging, safety, or other external monitoring devices, and the like. A preferred embodiment features five electrical contacts, , negative (−), internal temperature sensing (T), serial data port (D), serial clock port (C), and positive (+).

To accommodate utility with the universal charging unit of the present invention, the range of battery packs of different sizes, voltages, and/or capacities each must feature a commonly spaced and situated set of receptor contacts. The universal charger unit features a connector with electrical contacts spaced and situated to mate with the common receptor contacts of each of the different battery packs to which it may be connected. Accordingly, each of a fixed set of contacts on the charger unit connector must pair with each of a matching set of receptor contacts on each of the range of battery packs to which the charger unit is to be universally applicable. However, compatible inter-connection alone is not the sole requirement in achieving a universal charger unit, since the range of battery packs to be recharged include a variety of physical arrangements and/or chemistries presenting different electrical characteristics (e.g., voltages, charge rates, heat generation profiles, overpotential levels, capacities, and the like) which mandate different charging regimes. There needs to be a means for self-adjusting the charger unit to produce an output safe, effective, efficient, and compatible with each specific battery pack to be recharged. The presently invented charger unit features a connector preferably including a sensor, most preferably a set of multiple sensors, to sense and/or interpret the electrical specifications of the battery pack to which it is connected, in order to indicate the appropriate charging regime to the charger unit. The sensor may incorporate any conventional sensing scheme to interact with the battery pack receptor, such as mechanical or electrical switches or contacts, laser, sonar, and/or photoelectric devices. In one embodiment, the male connector on the charger unit includes a sensor comprising at least one, or preferably a pattern of depressible male tabs which interact with the structure of the female receptor on the battery pack. Each battery pack receptor, in addition to having a set of matching female contacts for each of the fixed male contacts, also has a specific patterned structure to interact with the depressible male tabs of the charger connector. Each battery pack requiring the same charging input features the same patterned structure. The number of depressible tabs on the charger connector is dictated by the number of control factors needed for input to the charger unit in order to adjust for appropriate output to the battery pack being charged.

In a preferred embodiment, the patterned structure of the female receptor of a rechargeable energy storage battery pack comprises a pattern of female openings and/or blocking members arranged in positions corresponding to the positions of the depressible male tabs of the charger unit connector. If the depressible male tab is matched with a blocking member on a battery pack, it is urged into its depressed position as the male contacts of the charger unit connector are inserted into their female contact counterparts on the battery pack receptor; if the depressible male tab is matched with a female opening in the battery pack receptor, it is not depressed, but rather, it penetrates the female opening as the male contacts of the charger unit connector are inserted into their female contact counterparts on the battery pack. The interconnection positions of the depressible male tabs on the charger unit indicates the required voltage output performance of the charger. For example, the charger unit could be interchangeably controlled to provide constant potential charging, constant current charging, trickle charging, or multi-step charging schemes. In a preferred embodiment, the charger unit connector is equipped with three depressible male tabs that provide for the potential of eight different combinations of positions and therefore has the potential to accommodate battery packs with eight different charging requirements. Depressible tabs can be added, or subtracted, of course, to accommodate as many different charging characteristics as may be required. Once the connector of the charger unit is disconnected from the battery pack receptor, the depressible tabs reset to their original position.

The connector on the charger unit may be a fixed connector permanently attached to the charger unit, or preferably, the connector comprises a connector module that is removable from the charger unit and is capable of being used in combination with a variety of battery charger unit forms depending, for example, on the desired form characteristics most accommodating for a certain type of rechargeable device. Additionally the connector, the connector module, and/or the charger unit also may include one or more replaceable electronics modules, in order, for example, for individual users and/or charger unit manufacturers to be able to upgrade and accommodate new technologies, chemistries, software, or voltage ranges in battery packs, without the need to replace an entire charger unit.

For a further understanding of the nature of the present invention, as well as other features and advantages thereof, reference now may be had to the following detailed description of preferred embodiments, taken in conjunction with the accompanying drawings wherein:

FIG. 1 depicts a perspective, cut-away view of a charger unit connector according to the present invention, and a corresponding rechargeable energy storage device receptor.

FIG. 2 shows simplified top view of a series of rechargeable energy storage devices featuring various receptor structures representing different device sizes, voltages, and capacities.

Figure 3:
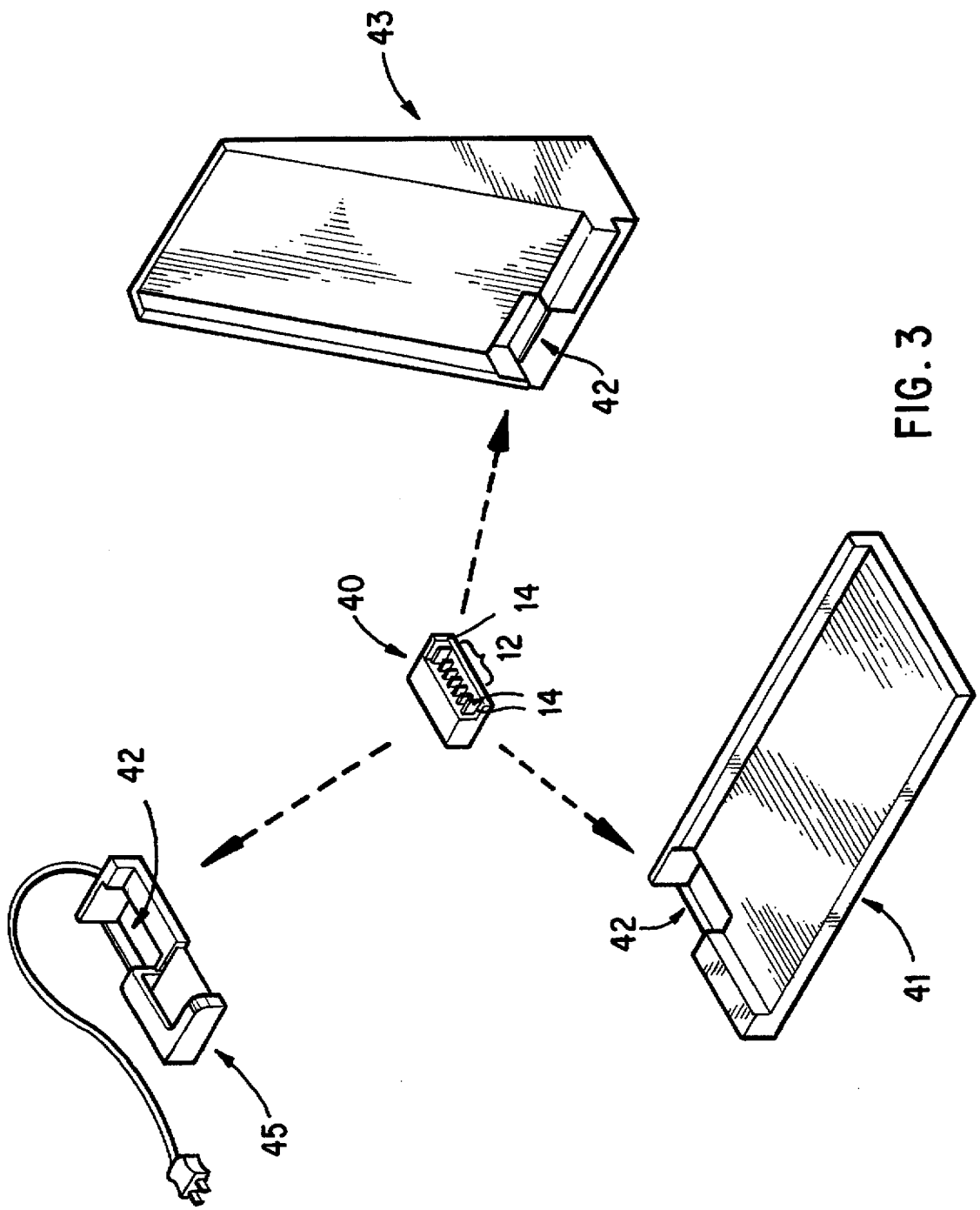
FIG. 3 is a perspective view of a connector module, according to the present invention, indicating the interchangeability of the module with various charger unit forms.

Referring to FIG. 1, pursuant to the present invention, there is contemplated a charger unit having a universal connector 10 including a standard set of five, fixed, male contacts 12. The five male contacts consist of a negative contact (−), an internal temperature sensing contact (T), a serial data port (D), a serial clock port (T), and a positive contact (+). The connector also features three, depressible, spring-loaded, male tabs 14, which, when fully extended, protrude from the connector in the same manner as contacts 12. However, when depressed, tabs 14 can be forced to retract into the connector housing. The contacts 12 and depressible tabs 14 are set with standard spacings from each other and from reference side wall 16.

The set, standard spacings of the male contacts 14 are intended to correspond with a standard set of female receptor slots 18 in rechargeable battery pack 20. According to the present invention, each of a variety of rechargeable battery packs, featuring different voltages, capacities, and physical dimensions, include a standard set of female receptor slots 18, of the same size, and with the same spacings from each other and from the side 22 of the battery pack. In this manner, the receptor slots 18 of battery pack 20 will always be set for alignment with the corresponding male contacts 12 of the charger connector 10.

A sensor comprising depressible tabs 14 of the charger connector are designed to interact with corresponding structures associated with the receptor of battery pack 20. As shown in FIG. 1 in phantom, dotted-line outline, battery pack 20 is provided with a pattern of structures 24 corresponding with one or more of the depressible male tabs on the charger connector. When battery pack 20 is mounted on charger unit 10 and male contacts 12 are inserted into corresponding female slots 18, depressible male tabs 14, in turn, also will interact with structures 24, penetrating any opening encountered in the battery pack receptor. Alternatively, if openings are not provided, male tabs 14 will encounter a blocking structure when the connection is made between the battery pack and the charger unit. When encountering a blocking structure, spring-loaded, depressible, male tabs 14 will be urged into a depressed position. The position of each of the male tabs is sensed by the connector unit which then dictates the appropriate charging output regime for the specific battery pack mounted on the charger.

FIG. 2 depicts examples of a variety of battery packs (30, 31, 33, 35, and 37) featuring a range of sizes, voltages, and capacities. Each battery pack, according to the present invention, is equipped with a standard set of female receptor openings 18. In addition, each battery pack features a unique pattern of structures to interact with the male tabs of the charger unit in order to indicate its particular charging requirements. Accordingly, each battery pack includes either female openings 26 to receive male tabs 14, or have no corresponding female opening and thereby offer a blocking structure to depress a corresponding male tab. In operation, the charger unit thus automatically "reads" the electrical specifications of the battery pack to which it is connected and regulates its output to match those requirements.

In FIG. 3, an embodiment of the invention is shown wherein the charger connector comprises a connector module 40 which includes fixed set of standard male contacts 12 and a set of three depressible male tabs 14. As indicated in the figure, connector module 40 interchangeably can be fitted into openings 42 and be utilized with a variety of charger mounting arrangements represented by flat faceplate 41, wall mount faceplate 43, and portable charger unit 45.

Figure 4:
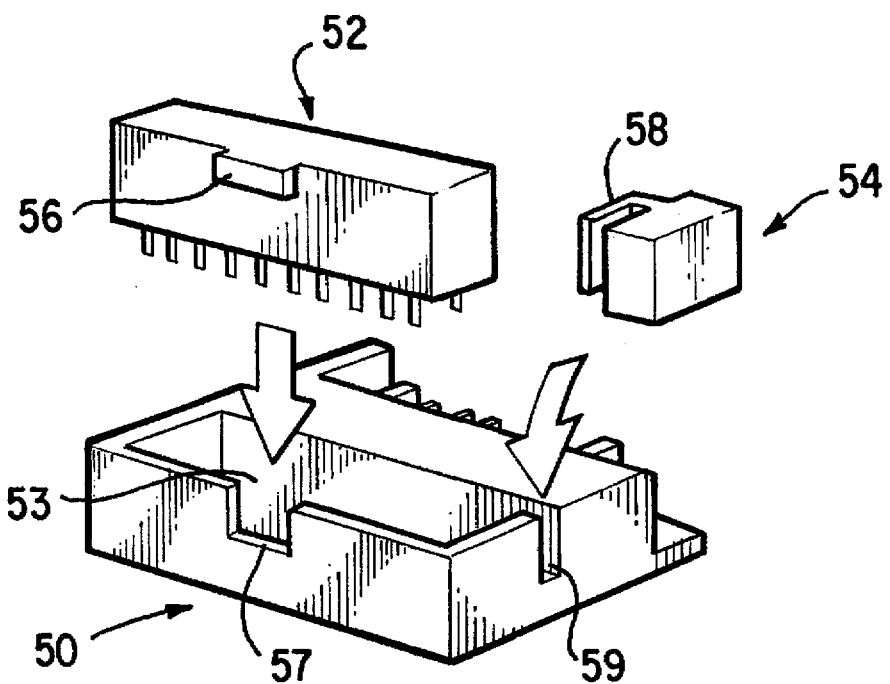
FIG. 4 is a perspective view of a connector module including two replaceable electronics modules.

To facilitate an upgrade of the electronics of the charger unit, as illustrated in FIG. 4, charger connector module 50 includes replaceable electronic modules 52 and 54. The connector module includes a recess 53 into which the electronics modules are inserted. The electronics modules have tabs 56 and 58 to mate with slots 57 and 59 in the connector module to ensure property alignment and electrical connection. In this manner, the electronics of a charger unit readily can be upgraded or modified to meet the requirements of any new battery pack technology, chemistry, or electrical specifications.

Figure 5:
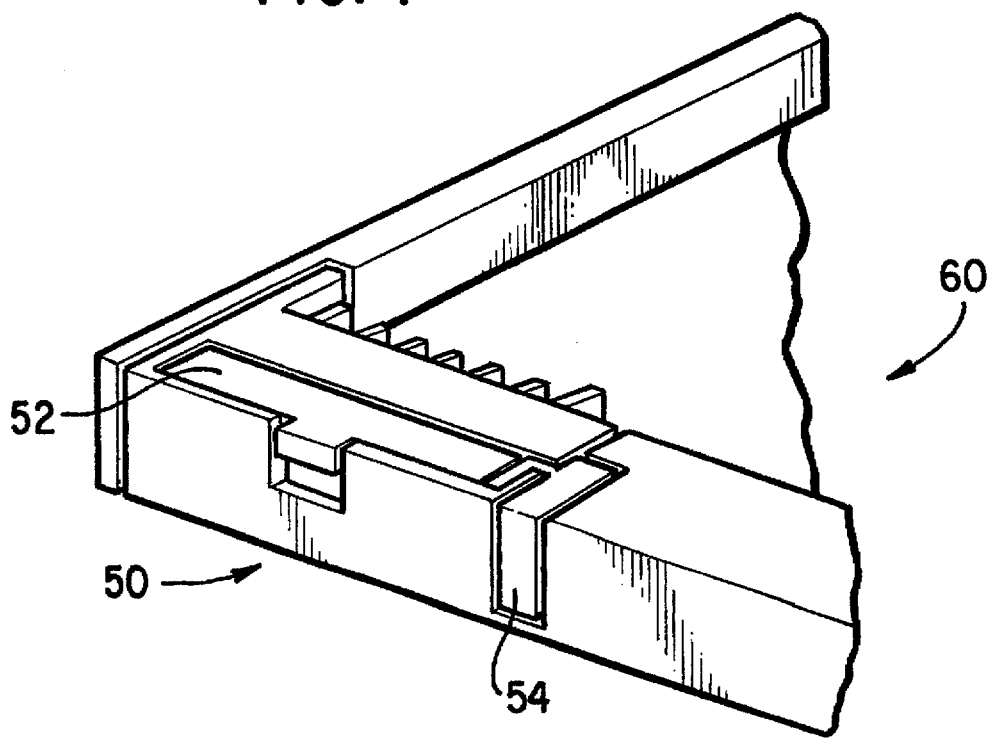
FIG. 5 is a perspective view of a connector module, with two replaceable electronics modules, set in position on a charger face plate.

FIG. 5 shows a connector module 50, equipped with electronic modules 52 and 54, fitted onto charger faceplate 60 and set for operation.

While there has been shown and described what are considered to be preferred embodiments of the invention, it will, or course, be understood that various modifications and changes in form or detail could readily be made without departing from the spirit and scope of the invention. It is, therefore, intended that the invention be not limited to the exact form and detail herein shown and described, nor to anything less than the whole of the invention herein disclosed as hereinafter claimed.

I claim:

1. A charger unit for electrically charging a rechargeable energy storage device, comprising:

a connector having a set of externally accessible, fixed, male contacts making electrical contact with a corresponding set of fixed female contacts on a rechargeable energy storage device, said connector including a sensor comprising a set of depressible male tabs to interact with a corresponding set of identifying structural elements on the rechargeable energy storage device, to thereby interpret the electrical characteristics of said device, to enable the position of the tabs to regulate the output of the charger unit to match the charging requirements of said device said, structural elements on the rechargeable energy storage device comprising at least one of a female receptor opening into which at least one of said depressible tabs are insertable and a blocking element, said blocking element being aligned with and causing at least one of said tabs to become depressed when the connector and rechargeable energy storage device are brought together.

* * * * *